UNITED STATES PATENT OFFICE.

PAUL JULIUS, OF LUDWIGSHAFEN, GERMANY, ASSIGNOR TO THE BADISCHE ANILIN AND SODA FABRIK, OF SAME PLACE.

BLACK DYE.

SPECIFICATION forming part of Letters Patent No. 644,234, dated February 27, 1900.

Application filed September 10, 1898. Serial No. 690,651. (Specimens.)

*To all whom it may concern:*

Be it known that I, PAUL JULIUS, doctor of philosophy, a subject of the Emperor of Austria-Hungary, residing at Ludwigshafen-on-the-Rhine, in the Kingdom of Bavaria and Empire of Germany, have invented new and useful Improvements in the Manufacture of New Disazo Dyes, of which the following is a specification.

I have invented a group of secondary disazo dyes from a certain nitro-amido-phenol-sulfo-acid, a so-called "middle component"—namely, alpha-naphthylamin or the alpha naphthylamin sulfo-acid known as "Cleve's," which is a mixture of 1:6 and 1:7 sulfo-acid—and a further component—namely, beta-naphthol, alpha naphthylamin or naphthol-sulfo-acid, (1:4 or 1:5,) ethyl-beta-naphthylamin, 1:8-naphthylamin sulfo-acid, beta-naphthol-di-sulfo-acid R, and 1:3:6-alpha-naphthol-di-sulfo-acid. In an application of even date herewith I claim this group of coloring-matters generically, and also the specific coloring-matters from naphthol sulfo-acid, (1:4 or 1:5.) In the present application I do not claim these, but desire to protect by Letters Patent the specific coloring-matter having alpha-naphthylamin as both middle and end component.

The nitro-amido-phenol-sulfo-acid which I use in this invention has been described in the specification of German Letters Patent No. 93,443, and the constitution

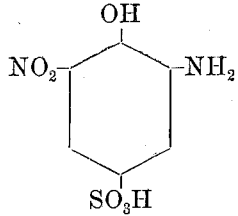

has been attributed to it—that is to say, it is regarded as a para-sulfo-acid of ortho-nitro-ortho-amido-phenol.

The following example will serve to illustrate the manner in which the invention can be carried into practical effect and my new dyes obtained.

Example: Dissolve about twenty-three and a half ($23\frac{1}{2}$) parts of the nitro-amido-phenol-sulfo-acid hereinbefore defined in about five hundred (500) parts of water and diazotize by treatment with about fifteen (15) parts of hydrochloric acid (containing about thirty (30) per cent. HCl) and about seven (7) parts of sodium nitrite at the ordinary temperature. Pour the diazo solution into a solution of about fifteen (15) parts of alpha-naphthylamin in six hundred (600) parts of water and fifteen (15) parts of hydrochloric acid, (containing about thirty (30) per cent. HCl.) Stir at a temperature of about from thirty-five (35) to seventy-five (75) degrees centigrade till a test portion on filter-paper gives no reaction of diazo compound. This usually requires from ten to twenty-four hours, the time depending principally upon the temperature maintained. Filter the intermediate coloring-matter obtained and wash with cold water. Dissolve the intermediate coloring-matter in about two thousand five hundred (2,500) parts of boiling water, to which about seventeen (17) parts of caustic-soda lye (containing about thirty-five (35) per cent. NaOH) are added. Allow the solution to cool and add seven and a half ($7\frac{1}{2}$) parts of sodium nitrite in the form of a concentrated solution. Pour this mixture into a dilute sulfuric acid containing about two hundred (200) parts of ice, thirty (30) parts of sulfuric acid, (containing about ninety-five (95) per cent. $H_2SO_4$,) and ninety (90) parts of water. Stir while mixing, and subsequently a precipitate separates out which is at first dark in color and gradually becomes brown. Filter, stir with cold water, and pour into a solution of about eighteen (18) parts of alpha-naphthylamin chlorhydrate. The formation of coloring-matter is soon completed. Add soda solution to convert into sodium salt. Add common salt to complete the precipitation of the coloring-matter and filter and press. Purify, if necessary, by redissolving and re-precipitating. If desired, the combination can be effected without first collecting the diazo compound by filtration if excess of nitrite be avoided.

My new coloring-matter dyes wool in dark-bluish shades which turn deep black on subsequent treatment with chromates and is characterized by its behavior on reduction with ammonium sulfid in ammoniacal solution. When suitably reduced, a step-by-step reduction can be observed and an amido body can be obtained which can be diazotized and combined with R-salt yielding an azo dye which is violet-blue in the presence of alkalies, turning to intense red on treatment with hydrochloric acid just like the R-salt azo dye of ortho-nitro-ortho-amido-para-sulfo-acid. This test can be effected as follows: Heat up one (1) gram of coloring-matter with one hundred (100) cubic centimeters of water and add fifteen (15) cubic centimeters of ammonia, (containing twenty (20) per cent. $NH_3$.) The solution is dark blue in color. Add drop by drop to the nearly-boiling solution some fresh ammonium sulfid. The liquid turns through violet to deep red. This marks the first step of the reduction. Add more ammonium sulfid drop by drop, avoiding any considerable excess, and continue the treatment. The liquid turns brown. This marks another stage of the reduction, and the liquid contains the nitro-amido-phenol-sulfo-acid reproduced. Cool the liquid, add excess of hydrochloric acid, diazotize with sodium nitrite, filter, and run the diazo solution into an alkaline solution of R-salt containing, say, two (2) grams R-salt and twelve (12) grams soda in one hundred and twenty (120) parts water. A violet-blue azo dye is obtained which turns to red in the presence of hydrochloric acid.

My new dye with alpha-naphthylamin as middle and end component is further characterized by yielding a deep-blue solution in concentrated sulfuric acid.

The solution of the coloring-matter in one thousand times its own weight of water is violet-red. On adding a little caustic soda to this solution no change of color is observed when looking at the solution in bulk. On adding hydrochloric acid to this solution a purple-black precipitate is obtained, and ferric chlorid throws down a violet-brown to brown precipitate.

Now what I claim is—

As a new article of manufacture the specific new coloring-matter which can be derived from ortho-nitro-ortho-amido-phenol-sulfo-acid and alpha-naphthylamin as middle and end component and which is characterized by its behavior on suitable reduction with ammonium sulfid in ammoniacal solution in that a step-by-step reduction reproducing the nitro-amido-phenol-sulfo-acid can be observed and which yields a deep-blue solution in concentrated sulfuric acid, a violet-red solution in water, no perceptible change of color in bulk on the addition of a little caustic soda, a purple-black precipitate with hydrochloric acid, and a violet-brown to brown precipitate with ferric chlorid, all substantially as described.

In testimony whereof I have hereunto set my hand in the presence of two subscribing witnesses.

PAUL JULIUS.

Witnesses:
BERNHARD C. HESSE,
ADOLPH REUSTINGER.